(12) United States Patent
Sunay (10) Patent No.: US 9,680,958 B2
(45) Date of Patent: Jun. 13, 2017

(54) SYSTEM AND METHOD FOR PROGRAMMABLE RADIO ACCESS NETWORKS

(71) Applicant: ARGELA-USA, INC., Sunnyvale, CA (US)

(72) Inventor: Mehmet Oguz Sunay, San Francisco, CA (US)

(73) Assignee: NETSIA, INC., Sunnyvale, CA (US)

( * ) Notice: Subject to any disclaimer, the term of this patent is extended or adjusted under 35 U.S.C. 154(b) by 0 days.

(21) Appl. No.: 15/169,713

(22) Filed: May 31, 2016

(65) Prior Publication Data

US 2017/0064031 A1  Mar. 2, 2017

Related U.S. Application Data

(60) Provisional application No. 62/210,800, filed on Aug. 27, 2015.

(51) Int. Cl.
| | |
|---|---|
| H04W 4/00 | (2009.01) |
| H04L 29/08 | (2006.01) |
| H04W 72/04 | (2009.01) |
| H04W 72/08 | (2009.01) |
| H04W 28/18 | (2009.01) |

(52) U.S. Cl.
CPC .......... *H04L 67/303* (2013.01); *H04W 28/18* (2013.01); *H04W 72/0486* (2013.01); *H04W 72/082* (2013.01)

(58) Field of Classification Search
USPC ........ 370/392, 250, 252, 254, 329, 336, 389
See application file for complete search history.

(56) References Cited

U.S. PATENT DOCUMENTS

| | | | |
|---|---|---|---|
| 8,335,703 B1* | 12/2012 | Pulier | H04L 47/822 705/7.11 |
| 8,351,948 B2 | 1/2013 | Kokku et al. | |
| 8,660,071 B2 | 2/2014 | Borran et al. | |
| 8,681,729 B2 | 3/2014 | Wengerter et al. | |
| 8,700,047 B2 | 4/2014 | Kokku et al. | |
| 8,831,522 B2 | 9/2014 | Bhattad et al. | |
| 8,873,482 B2 | 10/2014 | Kokku et al. | |

(Continued)

*Primary Examiner* — Phuongchau Ba Nguyen
(74) *Attorney, Agent, or Firm* — IP Authority, LLC; Ramraj Soundararajan (57) ABSTRACT

Disclosed is a novel base station that has a layer 1-3 protocol stack to control and process incoming/outgoing flows with user equipment (UE) and a Random Access Network (RAN) hypervisor virtualizing one or more instances, each instance corresponding to an active profile associated with the base station. Each such instance is associated with a given profile comprising: (1) an admission control module, (2) a handoff control module, and (3) a scheduling module. Also provided is a controller having: (1) an interface to communicate over a network with such base stations over a communication protocol to send the details of new profiles or modifications of existing profiles to such base stations, (2) a profile management application managing a database of a plurality of active profiles associated with the one or more base stations, and (3) a controller operating system that ensures that no two active profiles in said profile management application create conflicts in any of the one or more base stations.

20 Claims, 6 Drawing Sheets

(56) References Cited

U.S. PATENT DOCUMENTS

| | | |
|---|---|---|
| 8,874,125 B2 | 10/2014 | Mahindra et al. |
| 8,923,239 B2 | 12/2014 | Kokku et al. |
| 2011/0029347 A1 | 2/2011 | Kozat et al. |
| 2012/0002620 A1 | 1/2012 | Kokku et al. |
| 2012/0044876 A1 | 2/2012 | Taaghol |
| 2013/0094486 A1 | 4/2013 | Bhanage et al. |
| 2013/0159461 A1* | 6/2013 | Al Faruque ............ H04L 67/16 709/217 |
| 2014/0045513 A1 | 2/2014 | Lim |
| 2014/0247792 A1 | 9/2014 | Wang |
| 2015/0055623 A1* | 2/2015 | Li ........................ H04W 40/04 370/331 |

* cited by examiner

SYSTEM AND METHOD FOR PROGRAMMABLE RADIO ACCESS NETWORKS

RELATED APPLICATIONS

This application claims benefit of U.S. provisional application Ser. No. 62/210,800 filed Aug. 27, 2015.

BACKGROUND OF THE INVENTION

Field of Invention

The present application pertains to the radio access networks of wireless broadband communication systems, and more particularly to system and methods for creating virtual radio access network slices based on programmable profiles.

Discussion of Related Art

This invention is concerned with the virtualization of radio access networks of cellular wireless systems. The concept of virtualization may be described as a methodology that enables an underlying resource to be shared across multiple consumers, while providing each consumer with the illusion that it owns the entire resource. In wireless systems, specific applications and design goals lead to different virtualization methodologies. We can broadly categorize the concept of wireless virtualization into the following distinct perspectives: wireless network-level virtualization, device-level virtualization, flow-level virtualization, protocol-level virtualization, wireless resources-level virtualization. Most of the previous work on wireless virtualization focuses on a subset of these perspectives.

1. Wireless Network-Level Virtualization focuses on enabling multiple, isolated logical wireless networks, potentially each operated by a different mobile virtual network operator (MVNO), over a shared physical wireless network infrastructure. There may be different levels of network virtualization for a MVNO. The MVNO may have no infrastructure of its own and may be leasing all aspects of the cellular network from a mobile network operator (MNO) who owns the network infrastructure. Alternatively, the MVNO may own a portion of the network infrastructure, such as network services or even the entire core network, and lease only the access network from a MNO. 3GPP has defined an interoperability requirements document for cellular network-level virtualization for MVNOs. Wireless network-level virtualization may also be employed by a single network operator in order to define various logical networks within its coverage for various purposes.

2. Device-Level Virtualization focuses on decoupling a portion of the base station equipment from the rest so that the decoupled portion may be realized on commodity hardware in the cloud as a common resource to be shared across a group of base stations. This architecture is commonly referred to as Cloud-RAN in the literature. A typical base station is a distributed architecture composed of the baseband unit (BBU) and remote radio unit (RRU) parts. The BBU is placed in the equipment room and connected to the RRH via optical fiber. The Cloud-RAN architecture typically virtualizes the baseband unit (BBU) functionality in full and realizes them in a centralized pool in the cloud on high-performance programmable processors and real-time virtualization technology. The typical base stations are reduced to simple RRU units with antennas in this case. The patent application US 2014/0247792 A1 discusses a Cloud-RAN system and presents a resource scheduling method for the RRU to access the BBU realizations in the cloud.

3. Flow-Level Virtualization focuses on providing isolation, scheduling, management and service differentiation for both downlink and uplink traffic flows from other flows in a manner similar to how OpenFlow enables flow differentiation for software-defined networks (SDNs). One way of realizing flow-level virtualization is using an overlay filter and software switch module. This method, as described in the patent application US 2012/0002620 A1 does not require any modifications to the underlying base station. The patent application defines a group of select flows as a slice describes a so-called slice scheduler that is realized outside the base stations. The slice scheduler decides which of the flows should enter the base station and ensures that packets of flows from only the desired slice enter the base station at a given time. The base station then processes these flows in a typical manner by using a flow-level scheduler. Alternatively, flow-level virtualization could also be integrated into the base station protocol stack so that the slice scheduler is implemented within the stack, just before the flow scheduler. The U.S. Pat. No. 8,873,482 B2 discusses a flow-level virtualization for a base station where the uplink and downlink flows are grouped into base station slices. Each slice requests to reserve a portion of the base station resources and is given a normalized weight that reflects this request. The slice scheduler, which is implemented inside the base station, selects which slice to service at a given time, based on the slice weights. For that time, the base station is completely controlled by that slice. It then utilizes a flow scheduler to schedule which flows to service from that slice. The invention disclosed in the patent allows for each slice to have its own flow scheduling function.

4. Protocol-Level Virtualization focuses on the isolation, customization, and management of multiple protocol instances on one base station equipment. The resource to be virtualized depends on which aspects of the protocol stack are considered. For a MAC-layer virtualization, for example, the scheduling operation may be virtualized. In this case, the base station protocol stack is implemented in such a way that multiple instances of the scheduler may run on it. U.S. Pat. No. 8,700,047 B2 and U.S. Pat. No. 8,351,948 B2 define flow management functions that contain the operations of virtual time tagging of packets, scheduler operations and model specification operations that specify the relative weights of the flows, and discuss a method to dynamically change the flow management function, and thus the scheduler operation in a base station. Similarly, the U.S. Pat. No. 8,923,239 B2 discusses a base station that dynamically selects a scheduling operation based on a received model specification. Here, the model specification includes a weight distribution, modulation and coding scheme, packet loss value, and minimum and maximum rates of a flow. For a PHY-layer virtualization, on the other hand, the modulation, coding, and other signal processing modules that are implemented on a hardware DSP may be virtualized by defining a DSP sharing scheme for the multiple PHY instances. It is also possible to define a full protocol stack virtualization so that multiple different protocol stacks may operate on the same base station equipment. This is possible using a programmable software-defined radio (SDR) architecture. The SDR allows for a base station to support multiple radio access technologies using the same hardware components.

5. Wireless Resources-Level Virtualization focuses on the abstraction and dynamic allocation of the wireless radio resources, which are typically defined as a subset of the space defined by the frequency, time, code, power and antenna dimensions. The specific definition of the wireless resources is standard dependent. For example, in LTE, a wireless resource is commonly referred to as a resource block (RB) defined in the frequency-time space. Wireless resources-level virtualization provides the lowest level of slicing possible. There are multiple possible uses for wireless resources-level virtualization. It may be used in a cellular network to reduce the inter-base station interference. For example, U.S. Pat. No. 8,660,071 B2 and U.S. Pat. No. 8,831,522 B2 present similar distributed dynamic resource partitioning techniques among neighboring base stations so that the potential interference one base station causes to its neighbors is as small as possible. Similarly, the patent application US 2014/0045513 A1 discusses a scenario where multiple operators share wireless resources and a central management server oversees resource partitioning. The resources are dynamically partitioned amongst the operators in different parts of the network via resource ratio change messages sent by the management server. The wireless resources-level virtualization may also be used to satisfy quality-of-service (QoS) requirements of different flows. For example, LTE uses semi-persistent scheduling for voice flows where a specific RB is reserved for the voice call for the entirety of the call. U.S. Pat. No. 8,681,729 B2 discusses reserving specific RBs to multiple flows for a duration of time, described by a message. In the case where same RBs are reserved for multiple flows, the system employs a multiplexing technique for the flows to share the common RBs. Alternatively; the wireless resources-level virtualization may be used to allow for time. If no wireless-level virtualization is present when full protocol stack virtualization is employed, then the architecture remains merely a programmable hardware, where dynamically one can alter the active protocol stack in use as is described in the SDR. However, when both levels of virtualization are present, it is indeed possible for multiple instances of the protocol stack to run in parallel on the base station.

In a system architecture, it is possible to have multiple levels of wireless virtualization at the same time. For example, the U.S. Pat. No. 8,874,125 B2, discusses a wireless system with multiple entities (MNO and MVNOs) that utilizes a virtualization architecture that includes joint wireless network-layer virtualization, flow-level virtualization and partial protocol-layer virtualization. The disclosed system estimates resource requirements of the entities for each base station based on feedback from all base stations, computes the corresponding resource allocations amongst the entities and then enforces flow-level virtualization on each base station using the method of U.S. Pat. No. 8,700,047 B2.

The invention discussed herein proposes a novel radio access network virtualization framework that includes joint wireless network-layer virtualization, flow-level virtualization, protocol-layer virtualization and wireless resources-level virtualization using a profile definition. The profile specifies how the network of base stations are virtualized, how the flows within each of these virtual networks are virtualized, and specifies the protocol virtualization for the individual flows as well as the wireless-resources virtualization for them. No prior work describes radio access virtualization using all of the above listed levels of virtualization as is done in this invention.

Embodiments of the present invention are an improvement over prior art systems and methods.

SUMMARY OF THE INVENTION

In one embodiment, the present invention provides a base station comprising:
 (1) a layer 1-3 protocol stack to control and process incoming/outgoing flows with user equipment (UE);
 (2) a Random Access Network (RAN) hypervisor virtualizing one or more instances, each instance corresponding to an active profile associated with the base station, each instance associated with a given profile comprising: (i) admission control module implementing an admissions control algorithm determining whether to admit a flow request for the given profile, (ii) handoff control module defining and implementing a handoff operation for the given profile, and (iii) scheduling module defining and implementing a scheduling operation for the given profile, with each profile's scheduling module mapping flows associated with its users to available virtual radio resources; and
 (3) a wireless resources hypervisor mapping virtual resources from all active virtualized instances to one or more physical radio resources.

In another embodiment, the present invention provides a controller comprising:
 (1) an interface to communicate over a network with one or more base stations over a communication protocol to send the details of new profiles or modifications of existing profiles to the base stations, each base station comprising:
  (a) a layer 1-3 protocol stack to control and process incoming/outgoing flows with user equipment (UE);
  (b) a Random Access Network (RAN) hypervisor virtualizing one or more instances, each instance corresponding to an active profile associated with the base station, each instance associated with a given profile comprising: (i) admission control module implementing an admissions control algorithm determining whether to admit a flow request for the given profile, (ii) handoff control module defining and implementing a handoff operation for the given profile, and (iii) scheduling module defining and implementing a scheduling operation for the given profile, with each profile's scheduling module mapping flows associated with its users to available virtual radio resources;
  (c) a wireless resources hypervisor mapping virtual resources from all active virtualized instances to one or more physical radio resources;
 (2) a profile management application managing a database of a plurality of active profiles associated with the one or more base stations; and
 (3) a controller operating system that ensures that no two active profile in said profile management application creates conflicts in any of the one or more base stations.

In yet another embodiment, the present invention provides a base station comprising:
 (1) a processor; and
 (2) computer storage storing:
  (i) computer readable program code implementing a layer 1-3 protocol stack to control and process incoming/outgoing flows with user equipment (UE);
  (ii) computer readable program code implementing a Random Access Network (RAN) hypervisor virtualizing one or more instances, each instance corresponding to an active profile associated with the base station, each instance associated with a given profile comprising: (a) admission control module implementing an admissions control algorithm determining whether to admit a flow request for the given profile, (b) handoff control module defining and implementing a handoff operation for the given profile, and (c) scheduling module defining and implementing a scheduling operation for the given profile, with each profile's scheduling module mapping flows associated with its users to available virtual radio resources; and (iii) computer readable program code implementing a wireless resources hypervisor mapping virtual resources from all active virtualized instances to one or more physical radio resources.

In yet another embodiment, the present invention provides a controller comprising:

(1) a processor;

(2) an interface to communicate over a network with one or more base stations over a communication protocol to send the details of new profiles or modifications of existing profiles to the base stations, each base station comprising:
  (a) a layer 1-3 protocol stack to control and process incoming/outgoing flows with user equipment (UE);
  (b) a Random Access Network (RAN) hypervisor virtualizing one or more instances, each instance corresponding to an active profile associated with the base station, each instance associated with a given profile comprising: (i) admission control module implementing an admissions control algorithm determining whether to admit a flow request for the given profile, (ii) handoff control module defining and implementing a handoff operation for the given profile, and (iii) scheduling module defining and implementing a scheduling operation for the given profile, with each profile's scheduling module mapping flows associated with its users to available virtual radio resources;

(3) a database of a plurality of active profiles associated with the one or more base stations; and (4) computer storage storing computer readable program code implementing: (a) a profile management application managing the database of a plurality of active profiles associated with the one or more base stations; and (b) a controller operating system that ensures that no two active profiles in said profile management application creates conflicts in any of the one or more base stations.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention considers a programmable wireless radio access network (ProgRAN) where there exist a multiple number of base stations, a multiple number of users served by these base stations, and a set of radio access network (RAN) controllers, each controlling a group of base stations in a given geography of the network. The RAN controllers have the capability to control the virtualization of the RAN within their geography based on profiles that may be created, altered or removed dynamically.

A profile consists of the following information:
  A list of base stations (BSs) for which the profile is valid;
  A list of user equipment (UEs) and/or a list of flows for which the profile is valid;
  The time duration for which the profile is valid;
  The scheduling operation to be used for the profile;
  The handoff operation to be used for the profile;
  The admission control operation to be used for the profile;
  The percentage of wireless resources that the profile governs.

The time duration may be defined explicitly, with a corresponding start and end time. Alternatively, the start and the end might be event-triggered. It is also possible to have a combination of explicit time and event-triggering for time duration specification. In one example, the profile may become active at 06:00 pm and terminate at 08:30 pm on Aug. 1, 2016. In another example, the camping of a profile user in one of the profile base stations might trigger the profile to become active and the departure of all profile users from the profile geography might trigger the profile to terminate. Yet in another example, the profile might become active when a multimedia flow from/to a specific user starts sometime in the afternoon provided that is the weekend, and ends at the end of that weekend.

The wireless resources are usually defined as a combination of time, frequency, code space, transmit power, and antennas. In LTE, for example, a wireless resource is commonly referred to as a resource block (RB) and is composed of a time-frequency slot. The wireless resources that are available to a base station are typically limited in quantity.

For example, in an LTE system occupying a 20 MHz bandwidth, there are 100 resource blocks available for transmission. A profile governs only a subset of such resources for each base station that is part of that profile. It is possible to define one common value for all of the base stations in the profile, or specify a distinct value for each base station. The profile may define, for each base station, a subset of the resources as an explicit value or as a value that is not to be exceeded. For example, a profile may govern exactly 40 of the 100 available resources, or up to 40 of the resources for a base station.

For a given profile, it is possible to select scheduling, handoff and admission control operations from a set of available algorithms present in the base stations. Alternatively, it is also possible to develop new algorithms, remotely install them on the base stations and use them.

The scheduler in a cellular communication system is responsible for assigning the available resources to a subset of the service demanding users/flows at a given time. The scheduler repeats its decision on which users/flows to serve in regular intervals. For example, in LTE, the scheduler decides on which UEs will be assigned how many resource blocks repeatedly in 1 ms intervals. Typically, the scheduler uses the current and past UE observed channel quality parameters, the quality-of-service parameter of the flow, the buffer statuses of the active flows, the nature of the head-of-line packets of the flows, that is, whether the packets are ARQ packets, whether they are voice over IP packets, whether they are signaling packets etc. as well as assigned priorities to users/flows.

The handoff algorithm in a cellular communication system ensures that seamless service is available to mobile users as they traverse the network geography. The algorithm decides when to handoff a given user from a serving base station to a new one. It also decides on the identity of the new base station. Handoff algorithms may be categorized as UE controlled, network controlled, or hybrid. For example, in LTE, the handoff is UE assisted and network controlled. The UEs regularly send measurement reports to their serving base stations, and the base stations decide on a handoff based on these reports. There may be two distinct handoff algorithms: a seamless handoff where the goal is to conduct the handoff with minimal delay while allowing some data loss, and a lossless handoff where the goal is to conduct the handoff with no data loss while allowing some delay in data delivery during the handoff operation. The handoff procedure checks several parameters in received measurement reports to decide on the initiation. These parameters usually include, but are not limited to threshold levels to trigger the handoff, hysteresis margins, the minimum time interval over which the triggering condition needs to be satisfied before a handoff is triggered, and the length and shape of the averaging window for the measurements.

The admission control algorithm is effectively a decision module in which the output is a simple yes/no decision about whether to admit a flow request in the RAN. The inputs to the module typically include the current load of the base station, the nature of the request which identifies whether the request is an emergency call, whether it is a handoff request, a flow re-establishment or modification, whether it is for signaling as well as the quality-of-service level requested and the corresponding load increase to the base station.

In a RAN, there may be multiple active profiles at a given time. Furthermore, these profiles may be overlapping. In other words, there may be base stations in the RAN on which multiple active profiles run. In this case, each profile will govern a distinct and non-overlapping subset of the available resources. Each profile may potentially use different scheduling, handoff and/or admission control algorithms for its own users over its available set of resources. For example, while one profile that governs 40 of the resources for its group of users may employ a proportional fair scheduler, a lossless handoff control with a given set of handoff parameter values and an admission control rule favoring certain types of flows, another profile that governs 20 of the remaining resources for its group of users may employ a round robin scheduler, a seamless handoff control rule and an admission control rule that only allows voice connections from its users.

The mobile network operator (MNO) that employs ProgRAN may choose to define a default profile for each of its base stations so that the base station knows how to serve users/flows that do not belong to any profile. ProgRAN naturally supports the mobility of all of its users. When a user of a profile is handed off between two profile base stations, it continues to be served according to that profile's specifications. If that user is handed over to a base station where that profile is not valid, it will either be served according to another profile's specifications if it is a member of that new profile, or according to the specifications of the default profile if it is not. Similarly, a user that is being served according to the specifications of a default profile may be handed over to a base station where a valid profile is applicable to it. In this case, it will be handed over to that profile.

The RAN controller in the architecture controls and monitors all of the active profiles in the network, including the default profile. When a new profile is created, it is entered in the network via the RAN controller. The RAN controller is responsible for sending an abstracted version of the new profile information to the related base stations so that they can establish appropriate division of resources amongst active profiles and instantiate corresponding scheduling, handoff and admission control algorithms for each of these profiles. Prior to this, the RAN controller checks the integrity of the profile. If one or more entries of the profile create conflicts with other existing profiles, it ensures a proper resolution of such conflicts. There may be more than one RAN controller in a wireless network. In the presence of multiple RAN controllers, a clustering framework is used so that all RAN controllers share up to date state information with one another about active profiles across the entire network. In the case where multiple RAN controllers need to be involved during the establishment of a new profile, the clustering framework ensures that this operation is carried out without any problems.

The profiles in the RAN result in dynamic slicing of the RAN where each slice spans a given geography in the network and a subset of the wireless resources within this geography. The invention then creates a framework where the RAN operations of scheduling, handoff and admission control are virtualized so that potentially a different set of scheduling, handoff and admission control algorithms might be mapped to each such slice using a RAN hypervisor. The invention also allows for the virtualization of wireless resources. In the system disclosed in this invention, the profiles are allocated virtual wireless resources. Then, each profile, independent of how the rest of the base station operates, decides on the mapping of flow packets to its allocated virtual wireless resources. A wireless resources hypervisor in each base station is responsible for mapping the virtual wireless resources of all of the active slices running on the base station to the available physical wireless resources. The algorithm for mapping the virtual resources to physical resources may be as simple as static mapping, or random mapping. Alternatively, the mapping algorithm, using a function of the channel quality indicators received from the individual users, may aim to maximize the base station throughput, or maximize the throughputs of a select number of users, or strive towards any other suitable optimization rule.

Therefore, the invention presented herein allows multiple, hierarchical levels of virtualization in the RAN. The profiles allow for the virtualization of the network since a profile is potentially valid for only a part of the network. The profiles also allow for the virtualization of the base station scheduling, handoff control and admission control modules that are part of its protocol stack. For each profile running on a given base station, it is possible to run different sets of scheduling, handoff and admission control algorithms for the corresponding set of profile users and/or flows. The allocation of virtual resource blocks to each profile allows for the virtualization of the wireless resource mapping operation within each base station. This virtualization allows for the scheduling and resource mapping operations to be completely decoupled from one another.

The invention presented herein provides a fine-grain flexibility to a mobile network operator (MNO) to govern its RAN. Using the disclosed architecture, a MNO can easily develop new services for its customers. It is also possible for the MNO to dynamically lease parts of its network to mobile virtual network operators (MVNOs) using this architecture using a set of dynamic specifications that is not possible in today's networks. The invention also allows for a MNO to serve users and/or flows differently in isolated resource containers defined by the profiles for user and/or flow optimized handling.

Figure 1A:
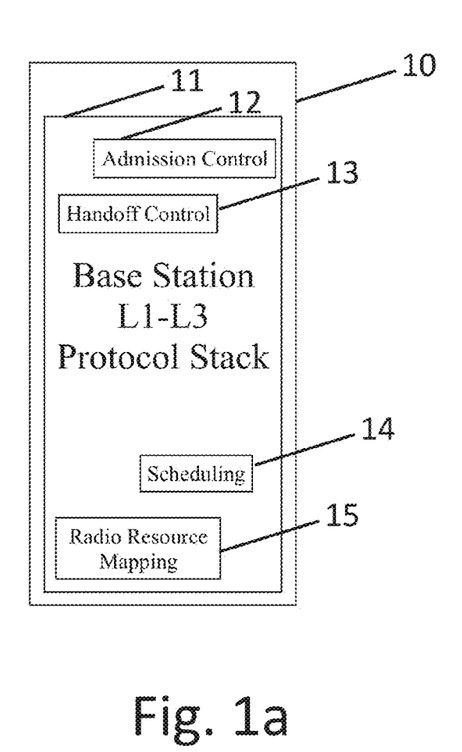
FIGS. 1A and 1B depict how the invention changes the base station architecture to enable the multi-tier virtualization.
Figure 1B:
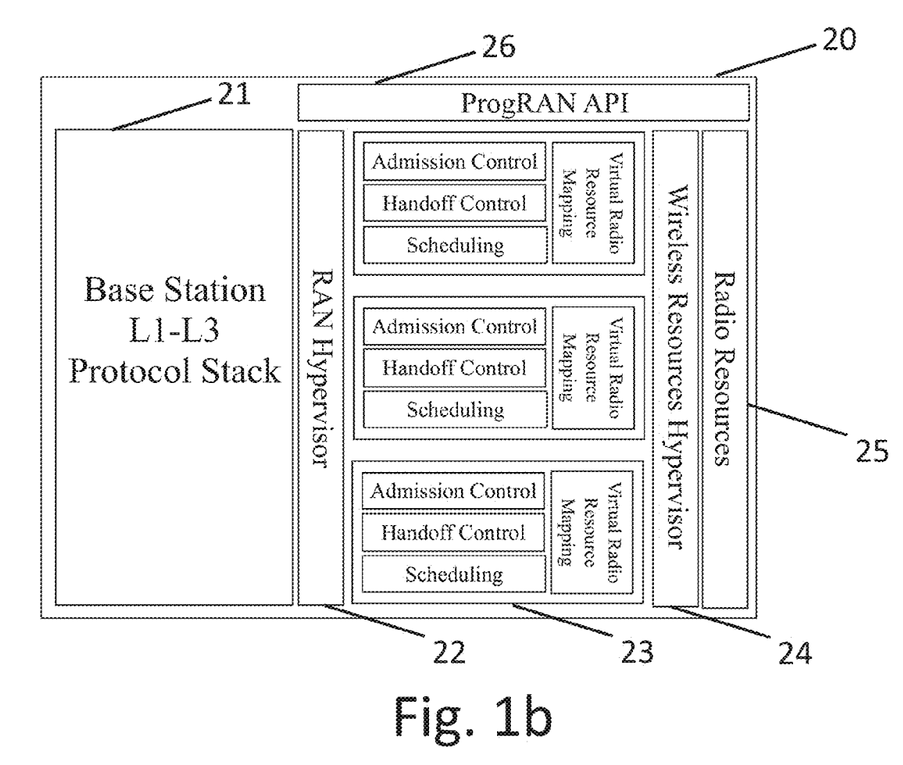

FIGS. 1a to 1b depict how the invention changes the base station architecture to enable the multi-tier virtualization described in the previous section. FIG. 1a illustrates the state-of-the-art base station (10) in today's cellular networks. The base station includes a Layers 1-3 protocol stack (11) that may be realized in software and/or hardware to control and process the incoming and outgoing flows to/from the user equipment (UEs) that is serves. The protocol stack of the base station includes Admission Control (12), Handoff Control (13), Scheduling (14) and Radio Resource Mapping (15) units.

In contrast, the base station of the invention is depicted in FIG. 1b as (20). The base station has the Layer 1-3 protocol stack (21) that may be realized in software and/or hardware to control and process the incoming and outgoing flows to/from the user equipment (UEs) that is serves. However, unlike the state-of-the-art base station, the Admission Control, Handoff Control, Scheduling and Radio Resource Mapping modules are virtualized using a RAN hypervisor (22). The RAN hypervisor allows for multiple instances of each of these modules to concurrently run on the base station protocol stack. Each of these instances (23) correspond to an active profile running on the base station and according to the specifications of the profile, the MNO employs different scheduling, admission control and handoff control algorithms. Each profile's scheduler maps the flows of its users to virtual radio resources. The virtual to physical radio resources (25) mapping is conducted by the wireless resources hypervisor (24) in the base station. This hypervisor conducts the mapping for all active profiles jointly according to a pre-defined rule. The base station of the invention also has an Application Program Interface (API) (26) that allows a remote controller to insatiate a new profile, or modify or cancel an existing one on the base station.

Figure 2:
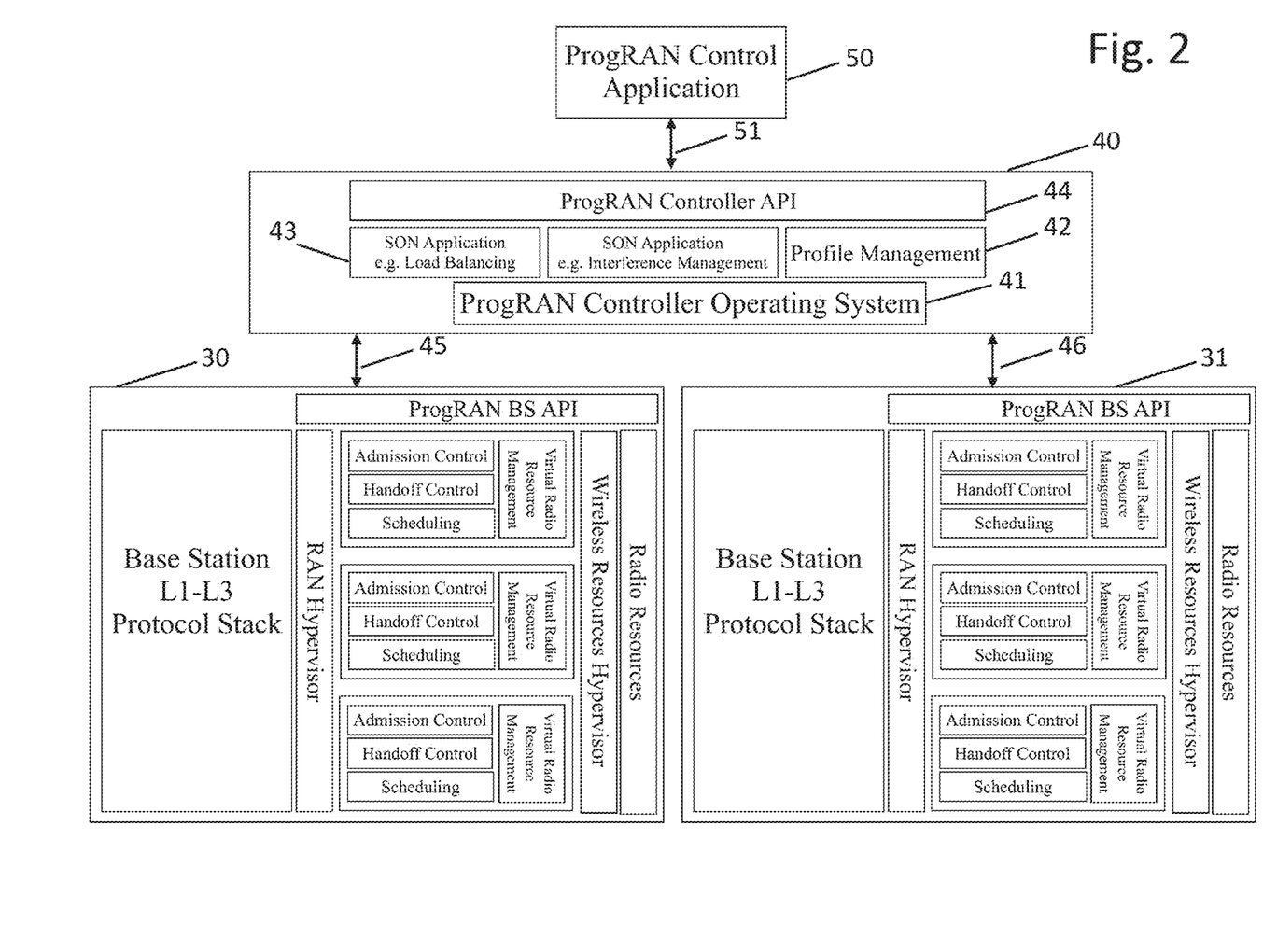
FIG. 2 depicts the overall programmable RAN (ProgRAN) system architecture of the present invention.

FIG. 2 depicts the overall programmable RAN (ProgRAN) system architecture of the invention. There exist multiple base stations (30, 31) in the system that are jointly controlled by a controller (40). The controller communicates with its base stations via a communication protocol (45, 46). This controller uses this protocol to send the details of new profiles or modifications of existing profiles to the base stations. In return, the base stations use this protocol to send usage statistics to the controller. The usage statistics include, but are not limited to the identities of active profile users, their average observed data rates, their channel quality indicator values, etc. The controller (40) includes an operating system that ensures that no two active profiles create conflicts in any of the base stations using a profile management application (42) that runs on it. The profile management application also manages a database for all active profiles. It also has a memory allocation to store all usage statistics received from the users. The controller also allows for self-organizing network (SON) applications (43) to run on its operating system. These applications may use usage statistics to centrally and dynamically alter the profiles to ensure load balancing across the profile base stations, interference management across the network, etc. The controller also has a northbound API (44) that allows for a remote controller application (50) that may be running on a remote computer, a remote mobile station, or a remote tablet, to invoke new profiles or monitor the network using a communication protocol (51).

Figure 3:
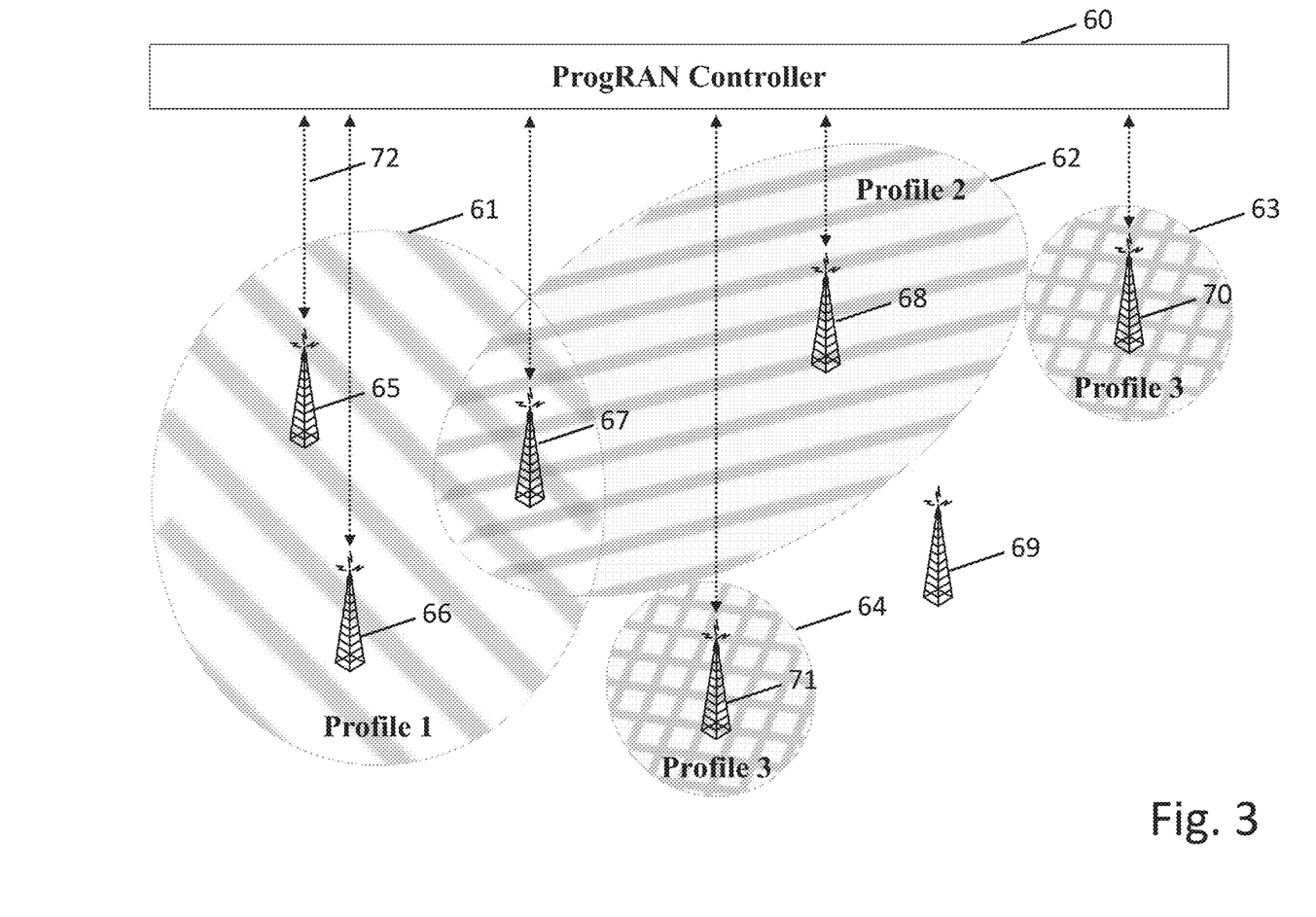
FIG. 3 depicts the virtualization of the network geography using profiles.

FIG. 3 depicts the virtualization of the network geography using profiles. The controller (60) sends active profile information to all relevant base stations (72). As a result, different, potentially overlapping profile geographies (61, 62, 63, 64) are formed. In the example depicted in FIG. 3, Profile 1 is active in the geography covered by the base stations (65, 66, 67). Similarly, Profile 2 is active in the geography covered by the base stations (67, 68) and Profile 3 is active in the geography covered by the base stations (70, 71). The base station 69 has no active profiles and thus all of its resources are open to all network users and default scheduling, admission control and handoff control algorithms are in use. It is clear from the figure that base station (67) has both Profile 1 and Profile 2 active. The controller ensures that for base station (67), these profiles are not in conflict. For example, the two profiles do not have the same UE and/or flow identities as members. Additionally, the controller ensures that these two profiles do not cumulatively attempt to govern more resources than is available at base station (67). FIG. 3 also depicts that a profile geography does not have to be contiguous. Profile 3 in the example is composed of two non-contiguous regions (63) and (64) that are covered by base stations (70) and (71), respectively.

Figure 4:
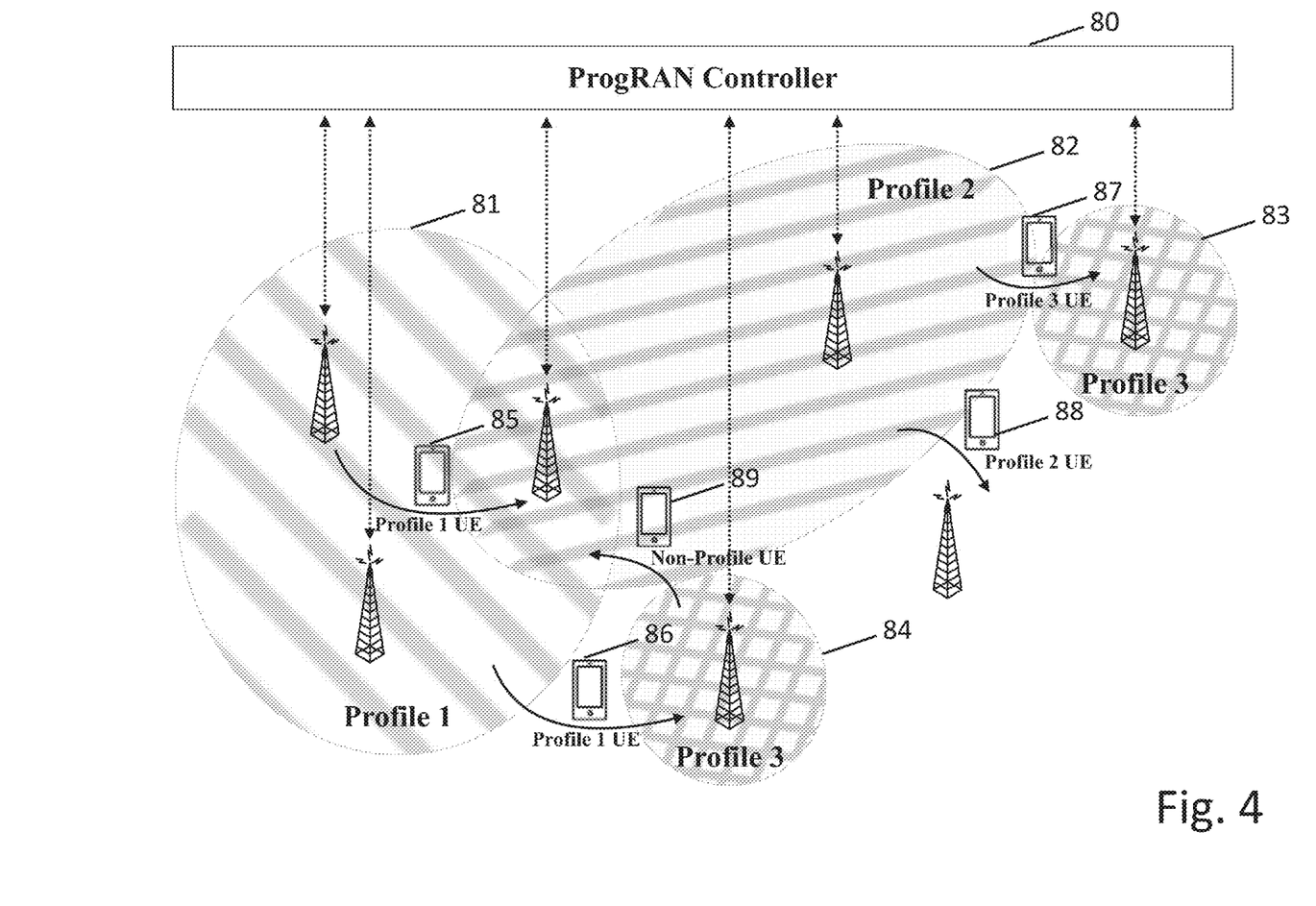
FIG. 4 depicts an example of how the handoffs occur in the invention.

FIG. 4 depicts how handoffs occur in the invention using an example. In the example, three profiles exist, each covering different, but potentially overlapping regions. Profile 1 covers region (81), Profile 2 covers region (82) and Profile 3 covers region (83) and (84). When a UE, which is a member of Profile 1 (85), is handed off within the Profile 1 geography, the profile details are maintained for that user. In other words, the same scheduling, admission control, handoff control algorithms are used and the user is still handled within the resources that are governed by Profile 1 after the handoff. On the other hand, when a UE, which is a member of Profile 1 (86), is handed off to a non-Profile 1 base station, that user is no longer treated as a Profile 1 in its new location. Instead, that user is treated either according to Profile 3 rules if it is also a member of Profile 3, or according to a default Profile which is defined across the entire geography for base stations to handle UEs that do not belong to any active profile. When a UE, which is a member of Profile 3 (87), is handed off from a non-profile base station to a Profile 3 base station, that user is treated according to the Profile 3 specifications in the new location. Similarly, when a UE, which is a member of Profile 2 (88), is handed off from a Profile 2 base station to a base station with no active profiles, that user is treated according to the default profile specifications. When a UE, which is not a member of an active profile (89), is handed off from a Profile 3 base station to a Profile 1&2 base station, the user continues to be treated according to the default profile specifications.

Figure 5:
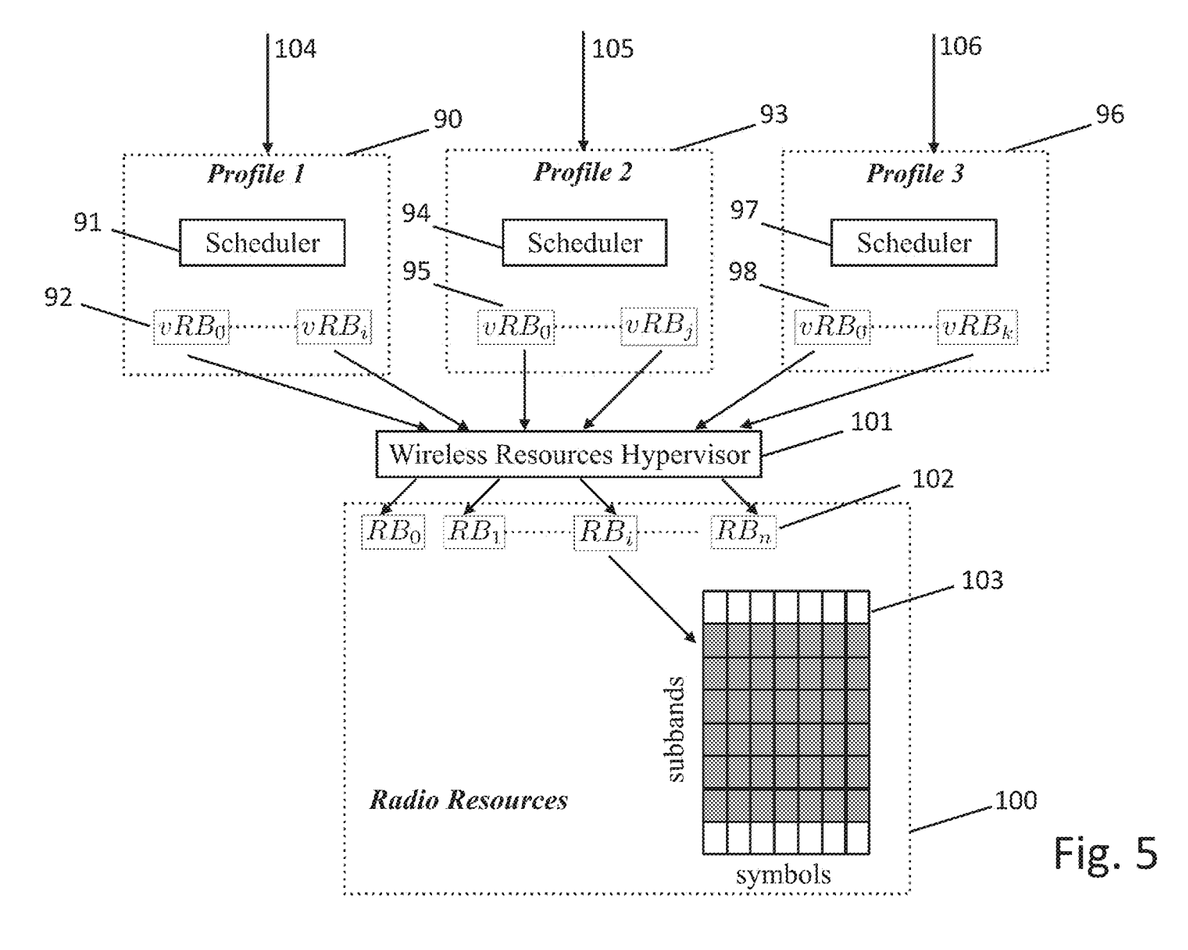
FIG. 5 depicts an example of how the wireless resources hypervisor in the base station maps virtual resources of all active profiles to physical resources.

FIG. 5 depicts how the wireless resources hypervisor in the base station maps virtual resources of all active profiles to physical resources using an example. In the example, there are 3 active profiles (90, 93, 96) with distinct schedulers (91, 94, 97) for each profile. The profiles have incoming flows from profile users (104, 105, 106). In the example, the 3 profiles are allocated i, j and k virtual resources (92, 95, 98), respectively. The schedulers map packets from incoming flows (104, 105, 106) to their allocated virtual resources. The wireless resources hypervisor (101) then maps the combined i+j+k virtual resources to the array of available resources (102), which are then mapped to the time-frequency resource blocks (103) according to, for example, the LTE standard. The mapping conducted by the wireless resources hypervisor does not need to be one-to-one. The hypervisor may map multiple virtual resources into one physical resource, or one virtual resource to multiple physical resources as it sees fit.

Figure 6:
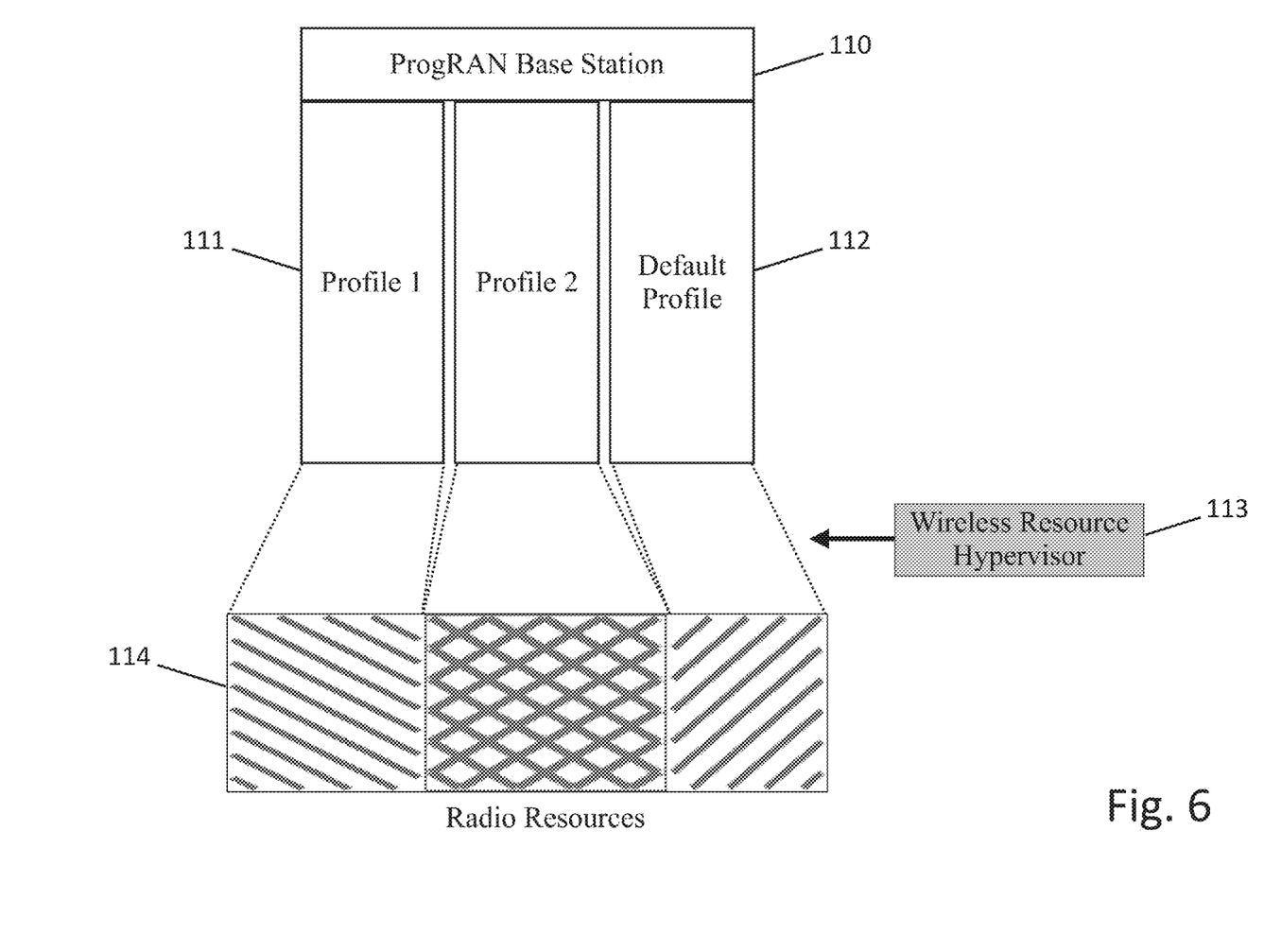
FIG. 6 depicts how the physical resources allocated to multiple active profiles running on a base station cannot overlap.

FIG. 6 depicts how the physical resources allocated to multiple active profiles running on a base station cannot overlap. In the example illustrated in the figure, there are 2 active profiles (111) and 1 default (112) profile running on the base station (110). The default profile is valid for all non-profile UEs for this base station. Each profile is allocated a set of virtual resources, which are then jointly mapped to the physical resources using the wireless resources hypervisor (113). If the mapping is one-to-one, the sum of allocated virtual resources may not be more than 100% of the total available physical resources (114) in the base station. If the mapping is many-to-one or one-to-many, the sum of the allocations of the physical resources should be less than or equal to what is available. The mappings could be persistent. In other words, for each profile, what is allocated could be preserved whether the profile utilizes them or not. Alternatively, the mappings may be non-persistent. In this case, if at a given time, a profile utilizes less than what is allowed, the non-used portion could be transferred to the default profile or one or more of the other profiles. However, a profile may never attempt to govern more resources than what is allowed.

The preferred embodiment of this invention describes a programmable radio access network (ProgRAN) composed of multiple base stations, multiple UEs and one or more RAN controllers. In the event that there are more than one RAN controllers, the preferred embodiment uses a clustering framework to share the network state among all existing RAN controllers.

The preferred embodiment describes a profile that consists of the following information:
  A list of base stations (BSs) for which the profile is valid;
  A list of user equipment (UEs) and/or a list of flows for which the profile is valid;
  The time duration for which the profile is valid;
  The scheduling operation to be used for the profile;
  The handoff operation to be used for the profile;
  The admission control operation to be used for the profile;
  The percentage of wireless resources that the profile governs.

The preferred embodiment describes the profile time duration with a corresponding start and end time. In another embodiment, the profile time duration start and the end times might be tied to the occurrence of certain events. Yet in another embodiment, a hybrid of explicit times event based time start or end times are used.

The preferred embodiment describes the wireless resources for a base station as a subset of the space defined by time, frequency, code, transmit power, and antenna dimensions. In the preferred embodiment, a profile governs only a subset of such resources for each base station that is part of that profile. In the preferred embodiment, one common value is used to describe the subset of available resources for all of the base stations in the profile. In another embodiment, a distinct value is used to describe the subset of available resources for each base station. In the preferred embodiment, an explicit value is used to describe the available subset of resources. In another embodiment, an upper bound is described for the available subset of resources as a value that is not to be exceeded.

The preferred embodiment describes a distinct set of scheduling, handoff and admission control algorithms for each profile present in the base station. In one embodiment, these algorithms are selected from a set of available ones. In another embodiment, new algorithms are created and pushed down by the RAN controller to the base station in question for use for a specific profile.

In the preferred embodiment, there are one or more active profiles running on a base station at a given time. One of these profiles is a default profile. All users that do not belong to a specific profile are treated as default profile users in the preferred embodiment. In the preferred embodiment, each profile governs a distinct and non-overlapping subset of the available resources. In the preferred embodiment each profile potentially uses different scheduling, handoff and/or admission control algorithms for its own users over its available set of resources.

In the preferred embodiment, when a user of a profile is handed off between two profile base stations, it continues to be served according to that profile's specifications. If that user is handed over to a base station where that profile is not valid, it will either be served according to another profile's specifications if it is a member of that new profile as well, or according to the specifications of the default profile if it is not. Similarly, a user that is being served according to the specifications of a default profile may be handed over to a base station where a valid profile is applicable to it. In this case, it will start to be served according to the specifications of that profile once the handoff procedure is complete.

In the preferred embodiment, the RAN controller controls and monitors all of the active profiles in the network, including the default profile. In the preferred embodiment, a new profile is entered in the network via the RAN controller. Then, the RAN controller sends an abstracted version of the new profile information to the related base stations so that they can establish appropriate division of resources amongst active profiles and instantiate corresponding scheduling, handoff and admission control algorithms for each of these profiles. Prior to this, the RAN controller checks the integrity of the profile in the preferred embodiment. If one or more entries of the profile create conflicts with other existing profiles, the RAN controller ensures a proper resolution of such conflicts. There may be more than one RAN controller in a wireless network. In the case where multiple RAN controllers need to be involved during the establishment of a new profile, the clustering framework ensures that this operation is carried out without any problems. In the preferred embodiment, the check for conflicts include ensuring that there is at most one active profile for one distinct UE or flow of UE in one base station and ensuring that the total number of resources governed by all active profiles in one base station does not exceed the number of available resources in that base station.

In the preferred embodiment of this invention, the profiles are allocated virtual wireless resources. Each profile, independent of how the rest of profiles in the base station operate, decides on the mapping of flow packets from its profile UEs to its allocated virtual wireless resources using its scheduler. A wireless resources hypervisor in the base station maps the virtual wireless resources of all of the active profiles running on the base station to the available physical wireless resources. In the preferred embodiment, the mapping algorithm used by the wireless resources hypervisor is programmable. In one embodiment, a static map is used for this purpose. In another embodiment, a random mapping is used. Yet in another embodiment, a function of the channel quality indicators received from the individual users is used so that the mapping results in maximum base station throughput. Yet in another embodiment, a function of the channel quality indicators received from the individual users is used so that the mapping results in maximum throughputs for a select number of users.

In one embodiment, the present invention provides a base station comprising:
(1) a processor; and
(2) computer storage storing: (i) computer readable program code implementing a layer 1-3 protocol stack to control and process incoming/outgoing flows with user equipment (UE); and (ii) computer readable program code implementing a Random Access Network (RAN) hypervisor virtualizing one or more instances, each instance corresponding to an active profile associated with the base station, each instance associated with a given profile comprising: (a) admission control module implementing an admissions control algorithm determining whether to admit a flow request for the given profile, (b) handoff control module defining and implementing a handoff operation for the given profile, and (c) scheduling module defining and implementing a scheduling operation for the given profile, with each profile's scheduling module mapping flows associated with its users to available virtual radio resources; and (iii) computer readable program code implementing a wireless resources hypervisor mapping virtual resources from all active virtualized instances to one or more physical radio resources.

In yet another embodiment, the present invention provides a controller comprising:
(1) a processor;
(2) an interface to communicate over a network with one or more base stations over a communication protocol to send the details of new profiles or modifications of existing profiles to the base stations, each base station comprising:
  (a) a layer 1-3 protocol stack to control and process incoming/outgoing flows with user equipment (UE);
  (b) a Random Access Network (RAN) hypervisor virtualizing one or more instances, each instance corresponding to an active profile associated with the base station, each instance associated with a given profile comprising: (i) admission control module implementing an admissions control algorithm determining whether to admit a flow request for the given profile, (ii) handoff control module defining and implementing a handoff operation for the given profile, and (iii) scheduling module defining and implementing a scheduling operation for the given profile, with each profile's scheduling module mapping flows associated with its users to available virtual radio resources; and
  (c) a wireless resources hypervisor mapping virtual resources from all active virtualized instances to one or more physical radio resources;
(3) a database of a plurality of active profiles associated with the one or more base stations; and
(4) computer storage storing computer readable program code implementing: (i) a profile management application managing the database of a plurality of active profiles associated with the one or more base stations; and (ii) a controller operating system that ensures that no two active profiles in said profile management application create conflicts in any of the one or more base stations.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable BluRay® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system, method and article of manufacture for programmable radio access network. While various preferred embodiments have been shown and described, it will be understood that there is no intent to limit the invention by such disclosure, but rather, it is intended to cover all modifications falling within the spirit and scope of the to invention, as defined in the appended claims.

The invention claimed is:

1. A base station comprising:
 a layer 1-3 protocol stack to control and process incoming/outgoing flows with user equipment (UE);
 a Random Access Network (RAN) hypervisor virtualizing one or more instances, each instance corresponding to an active profile associated with the base station, where a mobile network operator (MNO) serves users/flows differently as defined in each active profile, each instance associated with a given profile comprising: (1) admission control module implementing an admissions control algorithm determining whether to admit a flow request for the given profile, (2) handoff control module implementing a handoff algorithm as defined in the given profile and (3) scheduling module implementing a scheduling algorithm as defined in the given profile, with each profile's scheduling module mapping flows associated with its users to available virtual radio resources according to the scheduling algorithm defined in the given profile; and
 a wireless resources hypervisor mapping virtual resources from all active virtualized instances to one or more physical radio resources.

2. The base station of claim 1, wherein the active profile is centrally and dynamically altered by a profile management application using statistics.

3. The base station of claim 2, wherein the active profile is altered to ensure load balancing.

4. The base station of claim 2, wherein the active profile is altered for interference management.

5. The base station of claim 1, wherein the active profile comprises any of, or a combination of, the following information: a list of base stations (BSs) for which a given profile is valid, a list of user equipment (UEs) for which a given profile is valid, a list of flows for which a given profile is valid, a time duration for which a given profile is valid, a scheduling operation to be used for a given profile, a handoff operation to be used for a given profile, an admission control operation to be used for a given profile, an upper bound percentage of wireless resources that a given profile governs, or a percentage of wireless resources that a given profile governs defined for each profile base station.

6. A controller comprising:
an interface to communicate over a network with one or more base stations over a communication protocol to send the details of new profiles or modifications of existing profiles to the base stations, each base station comprising:
a layer 1-3 protocol stack to control and process incoming/outgoing flows with user equipment (UE);
a Random Access Network (RAN) hypervisor virtualizing one or more instances, each instance corresponding to an active profile associated with the base station, where a mobile network operator (MNO) serves users/flows differently as defined in each active profile, each instance associated with a given profile comprising: (1) admission control module implementing an admissions control algorithm determining whether to admit a flow request for the given profile, (2) handoff control module implementing a handoff algorithm as defined in the given profile, and (3) scheduling module defining and implementing a scheduling algorithm as defined in the given profile, with each profile's scheduling module mapping flows associated with its users to available virtual radio resources according to the scheduling algorithm defined in the given profile; and
a wireless resources hypervisor mapping virtual resources from all active virtualized instances to one or more physical radio resources;
a profile management application managing a database of a plurality of active profiles associated with the one or more base stations; and
a controller operating system that ensures that no two active profiles in said profile management application create conflicts in any of the one or more base stations.

7. The controller of claim 6, wherein the profile management application utilizes statistics to centrally and dynamically alter the plurality of active profiles.

8. The controller of claim 7, wherein the active profiles are altered to ensure load balancing across the base stations.

9. The controller of claim 7, wherein the active profiles are altered for interference management across the network.

10. The controller of claim 7, wherein the active profiles in the RAN result in dynamic slicing of the RAN, where each slice spans a given geography in the network and a subset of the wireless resources within this geography.

11. The controller of claim 10, wherein scheduling, handoff and admission control are virtualized such that a different set of scheduling and/or handoff and admission control algorithms might be mapped to each slice using the RAN hypervisor.

12. The controller of claim 7, wherein the active profile comprises any of, or a combination of, the following information: a list of base stations (BSs) for which a given profile is valid, a list of user equipment (UEs) for which a given profile is valid, a list of flows for which a given profile is valid, a time duration for which a given profile is valid, a scheduling operation to be used for a given profile, a handoff operation to be used for a given profile, an admission control operation to be used for a given profile, an upper bound percentage of wireless resources that a given profile governs, or a percentage of wireless resources that a given profile governs defined for each profile base station.

13. A base station comprising:
a processor; and
computer storage storing computer readable program code, wherein the processor executes the stored computer readable program code to:
implement a layer 1-3 protocol stack to control and process incoming/outgoing flows with user equipment (UE);
implement a Random Access Network (RAN) hypervisor virtualizing one or more instances, each instance corresponding to an active profile associated with the base station, where a mobile network operator (MNO) serves users/flows differently as defined in each active profile, each instance associated with a given profile comprising: (1) admission control module implementing an admissions control algorithm determining whether to admit a flow request for the given profile, (2) handoff control module implementing a handoff algorithm as defined in the given profile, and (3) scheduling module defining and implementing a scheduling algorithm as defined in the given profile, with each profile's scheduling module mapping flows associated with its users to available virtual radio resources according to the scheduling algorithm defined in the given profile; and
implement a wireless resources hypervisor mapping virtual resources from all active virtualized instances to one or more physical radio resources.

14. The base station of claim 13, wherein the active profile is centrally and dynamically altered by a profile management application using statistics.

15. The base station of claim 14, wherein the active profile is altered to ensure load balancing.

16. The base station of claim 14, wherein the active profile is altered for interference management.

17. The base station of claim 13, wherein the active profile comprises any of, or a combination of, the following information: a list of base stations (BSs) for which a given profile is valid, a list of user equipment (UEs) for which a given profile is valid, a list of flows for which a given profile is valid, a time duration for which a given profile is valid, a scheduling operation to be used for a given profile, a handoff operation to be used for a given profile, an admission control operation to be used for a given profile, an upper bound percentage of wireless resources that a given profile governs, or a percentage of wireless resources that a given profile governs defined for each profile base station.

18. A controller comprising:
a processor;
an interface to communicate over a network with one or more base stations over a communication protocol to send the details of new profiles or modifications of existing profiles to the base stations, each base station comprising:
a layer 1-3 protocol stack to control and process incoming/outgoing flows with user equipment (UE);
a Random Access Network (RAN) hypervisor virtualizing one or more instances, each instance corresponding to an active profile associated with the base station, where a mobile network operator (MNO) serves users/flows differently as defined in each active profile, each instance associated with a given profile comprising: (1) admission control module implementing an admissions control algorithm determining whether to admit a flow request for the given profile, (2) handoff control module implementing a handoff algorithm as defined in the given profile, and (3) scheduling module implementing a scheduling algorithm as defined in the given profile, with each profile's scheduling module mapping flows associated with its users to available virtual radio resources; and a wireless resources hypervisor mapping virtual resources from all active virtualized instances to one or more physical radio resources;

a database of a plurality of active profiles associated with the one or more base stations; and computer storage storing computer readable program code, wherein the processor executes the stored computer readable program code to implement (1) a profile management application managing the database of a plurality of active profiles associated with the one or more base stations; and (2) a controller operating system that ensures that no two active profiles in said profile management application create conflicts in any of the one or more base stations.

19. The controller of claim 18, wherein the active profiles in the RAN result in dynamic slicing of the RAN, where each slice spans a given geography in the network and a subset of the wireless resources within this geography.

20. The controller of claim 19, wherein handoff and admission control are virtualized such that a different set of scheduling and/or handoff and admission control algorithms might be mapped to each slice using the RAN hypervisor.

* * * * *